April 26, 1932.  R. W. DAVIS  1,855,385
POWER TRANSMITTING AND DISTRIBUTING MECHANISM
Filed May 10, 1930
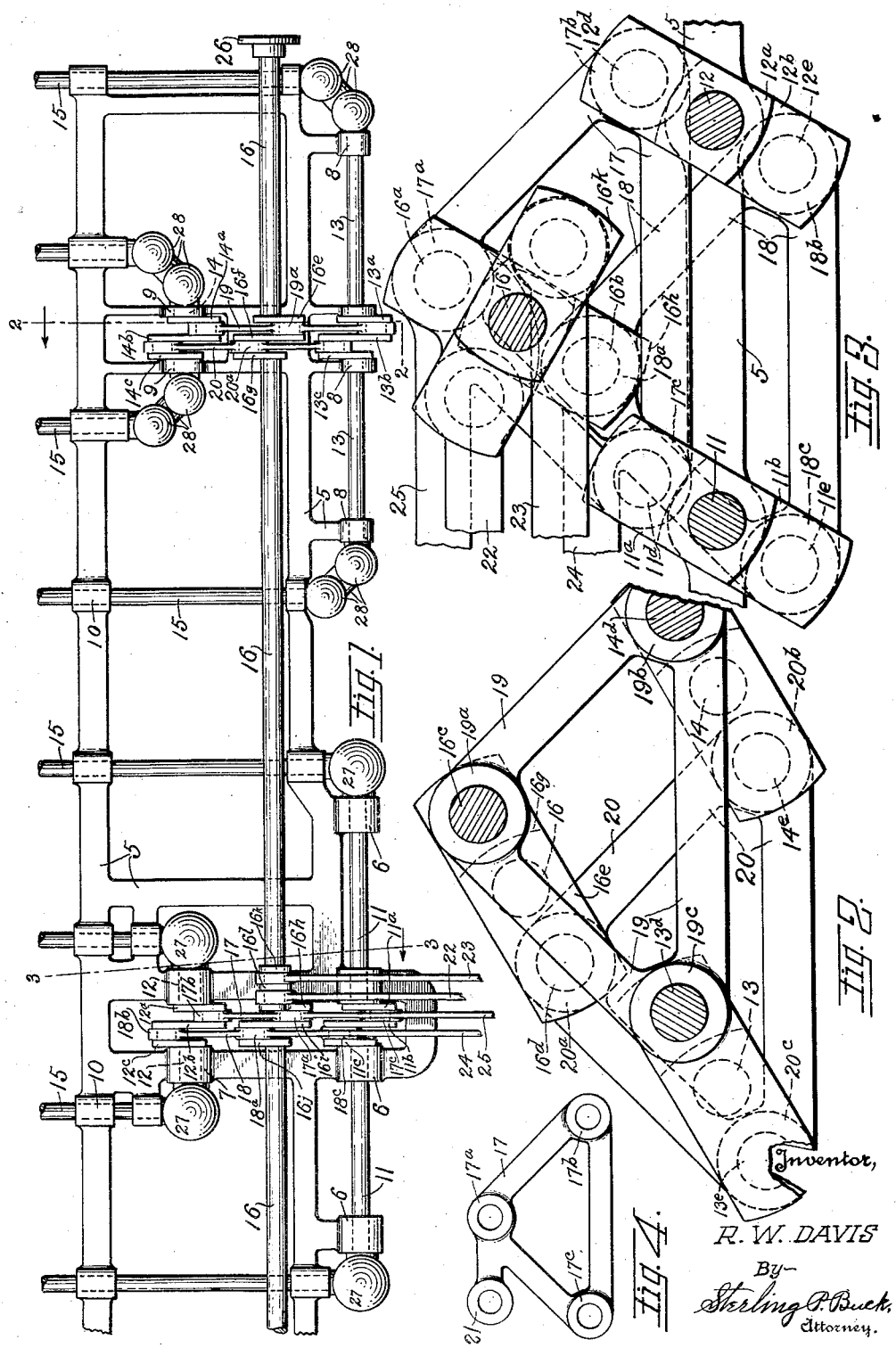
Inventor,
R. W. DAVIS
By-
Sterling P. Buck,
Attorney.

Patented Apr. 26, 1932

1,855,385

UNITED STATES PATENT OFFICE

ROBERT WILLIAM DAVIS, OF BALTIMORE, MARYLAND

POWER TRANSMITTING AND DISTRIBUTING MECHANISM

Application filed May 10, 1930. Serial No. 451,401.

This invention relates to power transmitting and distributing mechanisms, and especially to an improved multi-spindle mechanism.

One object of this invention is to provide an improved mechanism which is not only useful for many purposes, but especially useful for driving a group or series of parallel propeller-shafts of an airplaine or other air-craft.

To obtain the utmost efficiency in applying power to propellers, it is essential to reduce the number of power units without reducing the necessary power for driving the series or set of propellers.

Another object of this invention, therefore, is to provide an improved power transmission mechanism which is capable of being mounted so as to carry a series of propellers in a line parallel to and above the leading edge of a pair of wings or planes of an air-plane, and highly efficient and safe means for rotating the propeller-shafts from a single source of motive power, or from several combined or interchangeable power-sources.

The inventor is not unmindful of Patent Nos. 970,771 and 1,289,276, each showing propellers above the upper planes or wings, and a single power-source to drive several fans or propellers of each set; but the belts of the earlier patent will be likely to slip or to break; and the sprocket chains of the later patent are likely to fly from the teeth of the sprocket-wheels, or to ride up on the teeth and "stall" the motive power element, or to break. Any of these mis-behaviors of the transmission mechanism would probably result fatally for the air-plane and its occupants.

A further object, therefore, is to avoid the disadvantages of the power transmissions above referred to, and to provide a thoroughly practical, safe, efficient and comparatively low-cost mechanism for operatively connecting a plurality of driven shafts or propeller shafts to a single main driving shaft that may be rotated by one or more power units.

A further object is to provide an improved power transmission mechanism that includes a floating main driving shaft, viz., one that has no need of any fixed bearings, but has driving links that support it substantially in a fixed axial position while it rotates about its axis, thereby minimizing the cost and the friction.

Another object is to provide a transmission mechanism which includes a frame on which all other parts of the invention are mounted to combine in forming a unitary structure that can be moved and installed bodily without materially interfering with its different elements.

Another object is to provide an improved transmission mechanism which includes a novel form of fixed angle transmission coupling (to be described in a separate application), for turning a driven shaft by a driving shaft disposed at right angles (or other fixed angle) to the driven shaft.

Another object is to provide an improved transmission mechanism of which all working parts have surface-to-surface contacts, in contradistinction to the line-to-line and point-to-point contacts which are essential features in tooth-gearing, etc.; thereby providing the maximum durability.

Other objects or important features are pointed out or implied in the following details of description, in connection with the accompanying drawings in which:

Fig. 1 is a top plan view of a transmission mechanism constructed according to this invention, the universal joints being shown conventionally.

Fig. 2 is an enlarged sectional view, the section being taken substantially along the line 2—2 with respect to the main and intermediary or secondary shafts, the main frame being omitted.

Fig. 3 is an enlarged sectional view, the section being substantially along the line 3—3 (of Fig. 1) with respect to the main and intermediary shafts, but not with respect to the main frame, a part of the main frame being shown, the cranks of Fig. 3 being in different angles from those of Fig. 2, for more clearly showing their relation to one another in each group of cranks.

Fig. 4 is a slightly enlarged detail view of a slightly modified form of one of the crank-connecting triangular links such as the two shown in each of Figs. 2 and 3, for connection with connecting rods of engines for driving the transmission mechanism.

Referring to these drawings in detail, in which similar reference characters correspond to similar parts in the several views, the invention is now described in detail as follows:

The main frame is indicated at 5, and it may be made integral as shown, or made in any number of primarily separate parts. It may be supplied with any appropriate means to support and secure it in place on an air plane or on any surface where it may be installed for operation. It includes sets of bearings 6, 7, 8, 9 and 10, for the respective crank-shafts 11, 12, 13, 14 and the set of parallel propeller-shafts or driven shafts 15. The main driving shaft 16 has no bearings other than those that engage with its crank-pins or crank-journals 16a, 16b, 16c and 16d, of the two sets shown in Fig. 1, also separately shown in Figs. 1 and 2.

Triangular links 17, 18, 19 and 20 have their upper bearings 17a, 18a, 19a and 20a engaged with the respective crank-journals 16a, 16b, 16c and 16d, respectively. The links 17, 18, 19 and 20 are also provided with lower front bearings 17b, 18b, 19b, 20b, and with lower rear bearings 17c, 18c, 19c and 20c. These triangular links, or one or more of them, may be provided with a bearing or connecting rod attachment or connection 21, as shown in the slightly modified form, Fig. 4; but such connection is not essential where the connecting rod is directly connected to piston or cross-head, or to a driving crank that has a greater or less swing than the driven cranks which carry the triangular link.

The shaft 16 has crank-cheeks 16e, 16f, 16g, 16h, 16i, 16j, 16k and 16l, carrying the crank-pins on which the bearings 17a, 18a, 19a and 20a are journalled, and carrying the crank-pins on which are journalled two connecting rods 22 and 23. Connecting rods 24 and 25 (of the links 17 and 18) may either be driven by the same prime mover as that which drives the connecting rods 22 and 23, or may be driven by different prime movers. The shaft 16 may have any suitable driving or driven coupling 26 at either or both ends; and when used as a driving coupling, it may be directly connected to the rotary shaft of a motor or rotary engine; but when used as a driven coupling, it may be used to extend the shaft 16, or to attach either a universal coupling or a fixed angle coupling to drive an additional shaft 15.

The crank-shaft 11 has crank-cheeks 11a, 11b and 11c which carry the crank-pins 11d and 11e on which the rear parts of the links 17 and 18 are journalled. The crank-shaft 12 has crank-cheeks 12a, 12b and 12c which carry the crank-pins 12d and 12e on which the front bearings 17b and 18b are journalled.

It will be seen, therefore, that the diametrically opposite crank-pins of the shaft 11, and the diametrically opposite crank-pins of the shaft 12 support links 17 and 18 in a fixed angular relation to the frame 5 while these links support the driving shaft 16 in a fixed axial relation to the main frame and to the axes of the shafts 11, 12, 13 and 14, so the crank-bearings constitute the only essential bearings for the shaft 16. However, this statement refers to the crank-bearings of both sets and to the links 19 and 20 as well as the links 17 and 18. The construction of the second set of cranks is as follows:

Reference has previously been made to the cranks of the shaft 16, forming parts of the second set. Other parts of the second set are on the shaft 13, including crank-cheeks 13a, 13b, and 13c which carry crank-pins 13d and 13e. Other parts of this second set comprise crank-cheeks 14a, 14b and 14c which carry the crank-pins 14d and 14e.

The intermediate shafts 11 and 12 have their ends connected to corresponding propeller shafts 15 through the medium of fixed-angle transmission couplings such as shown conventionally at 27, and which may be of the kind shown in Patent No. 236,474, or in a patent application to be filed by me, for a fixed angle transmission coupling. These couplings 27 connect to four of the shafts 25 so as to cause them to rotate in unison with the shafts 11 and 12.

Duplex couplings 28 are connected to the ends of the shafts 13 and 14 and to four of the shafts 15, so as to drive these latter shafts in unison with the shafts 13 and 14. The couplings 28 may be of any proper and previously known type or kind, and are here shown conventionally.

Referring to the shafts 13 and 14, to the links which connect their cranks to that of the shaft 16, to the four couplings 28, and to the four shafts 15 driven by these couplings, it should be understood that such coupling or mechanism may be duplicated at the left side of the group which includes the couplings 27; that additional couplings may be added by connecting them to the coupling 26 of the shaft 16; and that this invention is not dependent upon any particular form or forms of fixed-angle coupling or other transmission coupling.

Although I have described this embodiment of my invention specifically, I have no intention of limiting my patent protection to these exact details of construction and arrangement, for numerous changes may be made within the scope of the inventive ideas as implied and claimed.

What I claim as my invention is:

1. In a power transmission mechanism, the combination of a relatively long rotary shaft having a crank thereon, a relatively short rotary shaft having a crank thereon, a link connecting the cranks of said shafts by being journalled thereon, a frame on which said rotary shafts are journalled substantially parallel to one another, four driven shafts journalled on said frame in substantially the same axial plane and substantially parallel to one another and angularly disposed with respect to said rotary shafts, and transmission joints connecting the respective ends of the relatively long and relatively short rotary shafts to the said four driven shafts for rotating the latter, the said relatively short shaft being axially disposed in said plane and between two of said driven shafts, substantially as shown.

2. In a power transmission mechanism, the combination of two relatively long rotary shafts each having a crank thereon, two relatively short rotary shafts each having a crank thereon, a frame on which said shafts are journalled, links each journalled on the crank of one of the relatively long rotary shafts and one of the relatively short rotary shafts, a transmission shaft having two cranks on which said links are journalled so as to operatively connect said two relatively long shafts and said two relatively short shafts for rotating in unison, eight driven shafts journalled on said frame in substantially the same axial plane and substantially parallel to one another and angularly disposed with respect to said rotary shafts, and eight transmission joints connecting the respective ends of said relatively long and relatively short rotary shafts to said eight driven shafts for rotating the latter, each of said relatively short shafts being axially disposed in said plane and between two of said driven shafts.

3. In a power transmission mechanism, the combination of two rotary shafts each having cranks substantially at opposite sides of its axis, a frame on which said shafts are journalled substantially parallel to one another, links each having a bearing journalled on a crank of each of said shafts, each of these links having an additional bearing, a transmission shaft having cranks substantially at opposite sides of its axis and journalled respectively in said additional bearings of said links, whereby said transmission shaft can be supported and rotated solely by said links, means being provided to impart motive power to said rotary shafts and links and transmission shaft, for the purpose specified.

4. In a power transmission mechanism, the combination of two rotary shafts each having cranks substantially at opposite sides of its axis, a frame on which said shafts are journalled substantially parallel to one another and in the same horizontal plane, links each having a bearing journalled on a crank of each of said shafts, each of these links having an additional bearing, a transmission shaft having cranks substantially at opposite sides of its axis and journalled respectively in said additional bearings of the links, means being provided to impart rotary motion to said rotary shafts and said transmission shaft, four driven shafts journalled on said frame and in angular relation to said rotary shafts and substantially in the same horizontal plane with said rotary shafts, and transmission joints connecting the respective ends of said rotary shafts to said driven shafts for operating the latter.

5. In a power transmission mechanism, the combination of two relatively short rotary shafts each having two cranks substantially at opposite sides of its axis, two relatively long rotary shafts each having cranks substantially at opposite sides of its axis, a frame on which said rotary shafts are journalled, links each having bearings journalled on a crank of one of said relatively short shafts and a crank of one of said relatively long shafts, each of said links having an additional bearing, and a transmission shaft having two sets of cranks, each of said sets comprising cranks at opposite sides of the axis of said transmisison shaft and journalled in said additional bearings of said links, whereby said transmission shaft cooperatively connects all of said rotary shafts, means being provided to effect rotation of said rotary shafts and transmission shaft, and a set of driven shafts journalled on said frame and disposed in substantially the same plane with the said rotary shafts and operatively connected to the latter for receiving rotary motion therefrom.

6. In a power transmission mechanism, the combination of two rotary shafts each having a crank thereon, a link journalled on both cranks of said rotary shafts so as to control the rotation of these shafts by one another, a frame on which said shafts are journalled substantially parallel to one another, driven shafts journallel on said frame and angularly disposed with respect to said rotary shafts, and transmission joints connecting the driven shafts respectively to said rotary shafts for effecting their rotation by the latter, means being provided to rotate said rotary shafts, substantially as shown.

7. In a power transmission mechanism, the combination of a pair of rotary shafts parallel to one another and each having a crank, a second pair of shafts parallel to one another and each having a crank and being spaced from the first said pair in longitudinal direction, a frame on which said rotary shafts are journalled, a transmission shaft having two cranks, a link having bearings journalled on the cranks of the first said pair of rotary shafts and on one of the cranks of said transmission shaft, a second link having bearings journalled on the cranks of the second said pair of rotary shafts and on the second crank of said transmission shaft, means being provided to effect rotation of said shafts in unison, driven shafts journalled on said frame in angular relation to said rotary shafts and transmission shaft, and transmission joints connecting ends of the driven shafts to ends of the said rotary shafts for effecting rotation of the driven shafts by said rotary shafts.

In testimony whereof I affix my signature.

ROBERT WILLIAM DAVIS.